United States Patent [19]

Nakano et al.

[11] Patent Number: 4,777,618

[45] Date of Patent: Oct. 11, 1988

[54] METHOD OF STORING, INDICATING OR PRODUCING SIGNALS AND APPARATUS FOR RECORDING OR PRODUCING SIGNALS

[75] Inventors: Jiro Nakano, Okazaki; Yoshizo Ito, Toyota; Hiroyasu Fukaya, Nagoya; Motozo Ikeda; Takashi Murosaki, both of Kariya, all of Japan

[73] Assignees: Nippondenso Co., Ltd., Toyota; Toyota Jidosha Kabushiki Kaisha, Kariya, both of Japan

[21] Appl. No.: 756,944

[22] Filed: Jul. 19, 1985

[30] Foreign Application Priority Data

| | | | |
|---|---|---|---|
| Jul. 19, 1984 | [JP] | Japan | 59-150444 |
| Jul. 19, 1984 | [JP] | Japan | 59-150446 |
| Jul. 19, 1984 | [JP] | Japan | 59-150447 |

[51] Int. Cl.[4] ..... G06F 15/20

[52] U.S. Cl. ..... 364/900; 364/431.04

[58] Field of Search ... 364/200 MS File, 900 MS File, 364/431.04, 569

[56] References Cited

U.S. PATENT DOCUMENTS

| | | | |
|---|---|---|---|
| 3,582,901 | 6/1971 | Cochrane et al. | 364/200 |
| 4,070,705 | 1/1978 | Lockwood et al. | 364/200 |
| 4,306,286 | 12/1981 | Cocke et al. | 364/200 |
| 4,363,097 | 12/1982 | Amano et al. | 364/900 X |
| 4,372,274 | 2/1983 | Takase | 364/431.04 |

*Primary Examiner*—Thomas M. Heckler

*Attorney, Agent, or Firm*—Cushman, Darby & Cushman

[57] ABSTRACT

The invention provides an arrangement for time correlating a computer's internal information with its input and output signals. The internal information is stored in a storage device along with time data indicative of the time at which the internal information was read. This time data is used to correlate the internal information, when read from storage, with the input and output signals. The invention also provides a more general arrangement for producing logic signals. Data for producing logic signals are stored in a memory. This data includes a transition time and a corresponding logic level after the transition. Logic signals are generated and "forced" to the logic level called for by the data read from memory. This allows logic signals to be produced from little data. This general scheme is applied to an arrangement for recording and reproducing digital and analogue signals. Digital data is recorded in memory and "reconstructed" using a single, common, clock is used for A/D and D/A converting to insure synchronism over a long period of time.

15 Claims, 19 Drawing Sheets

F I G. 11

| | MSB | LSB |
|---|---|---|
| 1st WORD | TIME DATA 1 | |
| 2 | 2 | |
| 3 | MONITOR DATA 1 | |
| 4 | 2 | |
| 5 | 3 | |
| 6 | 4 | |
| 7 | 5 | |
| 8 | 6 | |
| 9 | 7 | |
| 10 | 8 | |
| 11 | 9 | |
| 12 | 10 | |
| 13 | 11 | |
| 14 | 12 | |
| 15 | 13 | |
| 16 | 14 | |
| 17 | 15 | |

F I G. 14

| | MSB | LSB |
|---|---|---|
| 1st WORD | TIME DATA 1 | |
| 2nd WORD | TIME DATA 2 | |
| 3rd WORD | ADDRESS DATA | |
| 4th WORD | MONITOR DATA | |

| | S4 | S3 | S2 | S1 |
|---|---|---|---|---|
| t1 | 0 | 0 | 0 | 0 |
| t2 | 0 | 0 | 0 | 0 |
| t3 | 0 | 0 | 1 | 1 |
| t4 | 0 | 1 | 1 | 0 |
| t5 | 0 | 1 | 0 | 1 |
| t6 | 0 | 1 | 0 | 0 |
| t7 | 0 | 1 | 0 | 1 |
| t8 | 1 | 1 | 0 | 0 |
| t9 | 1 | 1 | 0 | 1 |
| t10 | 0 | 1 | 0 | 0 |
| t11 | 0 | 1 | 0 | 0 |
| t12 | 0 | 1 | 0 | 0 |

METHOD OF STORING, INDICATING OR PRODUCING SIGNALS AND APPARATUS FOR RECORDING OR PRODUCING SIGNALS

BACKGROUND OF THE INVENTION

1. Field of the Invention

This invention relates to an arrangement (apparatus and method) for storing, indicating or producing signals, and an arrangement for storing and indicating signals related to internal information of a computer stored in a random access memory, a register and the like together with input and output signals of the computer, a method of producing logical signals, an apparatus for recording signals and an apparatus for recording and producing signals, all of which are suitable for use in an engine control simulator for analyzing abnormal conditions and the like in an engine electronic control system using a microcomputer.

2. Description of the Related Art

In order to analyze an engine control system that in many ways acts as a plurality of feedback control systems (for controlling various aspects of engine operation based on sensed conditions), it is necessary to measure various sensor output signals and engine parameters at specific times and to know precisely the time at which a particular measurement was taken. In other words, many signals must be synchronized in the sense of knowing their corresponding timing relations.

In consequence, it may be proposed that not only the input and output signals of the computer but also the internal information of the computer, which have been stored in the random access memory, the register and the like are stored and indicated simultaneously.

However, when data obtained by measuring the input and output signals of the computer and storing the same are not synchronized with data obtained by reading the internal information of the computer and storing the same, the measurement and analysis cannot be accurately performed. It is not certain what values the computer has processed as input signals, how the computer has processed the input signals to calculate output values, whether the calculated values accurately correspond to the output signals, whether the timing between the calculated values and the output signal are accurate and so forth.

Furthermore, in order to analyze the aforesaid engine control system, it is necessary to have a simulation function for reproducing actual signals of the engine to reproduce troubles of rare occurance. In other words, it is necessary that signals measured and stored can be reproduced in waveforms indentical with the signals measured.

A known method for recording a plurality of waveforms of logic signals as time functions is to use a multipoint recorder and to record the signals simultaneously on a recording paper. This method works well for analogue signals, however, it is inconvenient for numerical analysis, because the recorded signals are not codified values.

Therefore, when a plurality of waveforms of logical signals are to be codified and recorded, the firstly proposed method is one, in which samples are taken at predetermined time intervals shorter than a waveform period of the logical signal having the shortest cycle out of the plurality of logical signals and the logical level thereof is codified for use by a logic analyzer. More specifically, as shown in FIG. 20 for example, samplings are taken of four signal waveforms S1-S4 shown in FIGS. 20(*a*)-20(*d*) by a predetermined interval shown in FIG. 20(*e*) such as t1-t12. Then, the logical levels at the sample times are recorded as 0 or 1 as shown in FIG. 21. Signals S1-S4 are associated with respective bits, whereby recording is performed in time series at every sampling time such as the times of t1-t14. However, this arrangement is not practical, particularly for engine analysis. In such analysis, there are multiple channels of logic signals and the frequency of occurrence of edges (changes of logic level) is low. The time interval between transitions of logic signal level becomes long with respect to the sampling period. Signal levels that do not vary in level from one measuring (sampling) time to the next are recorded at each measuring time. Thus the same signal level is recorded many times in the data accumulating area. When there are many channels of data to be recorded, the amount of data accumulated becomes enormous. This wastes a tremendous amount of data accumulating capacity. It is also difficult to timely transfer such huge amounts of data to a storage medium. For example, when input and output signals of 64 channels are measured at a time interval of required time accuracy of 5 microsecond (corresponding to 0.2° CA in a spark advance of 6000 rpm), the amount of data produced reaches 1.6 megabyte/sec, which exceeds the data transfer capability of a typical minicomputer, e.g. 600 kilobyte/sec. Further, if the waveform is not regular, then the cycle of the data sampling does not coincide with the time of the level transition, whereby it becomes difficult to reproduce the recorded input and output signals with high accuracy.

A method of obviating the above-described disadvantages is set forth in Japanese Patent Application No. 26722/1983 (laid open 9/1/85 and assigned to the same assignee as this application). A counter for counting clock signals of a predetermined period is actuated in synchronism with a control signal indicating the start of recording. The logical level of waveforms of a plurality of logical signals is monitored, and when a waveform edge portion indicating a transition of the logical level is detected, a signal label specifying the signal which has produced the aforesaid waveform edge portion, a logical level after the transition and edge detection data formed by a value of the aforesaid counter at the time of detecting the edge portion are recorded.

In other words, when the signal waves S1-S4 as shown in FIG. 20 are to be recorded by this method, the counter is actuated simultaneously with the start of recording of the logical signal, and the current time is indicated by counting the clock signals of the predetermined interval. When the waveform edge portions indicating the transitions of the logical signal with the respective logical signals are detected, i.e. at the time T1 of the signal S1, a data block 101 shown in FIG. 22 is outputted. One data block is constituted by a two word arrangement for example and a first word includes a label S1 specifying the logical signal in which the edge is detected and a value 1 of the logical level after the transition. A second word includes a transition time T1 of the logical level, i.e. the value of the counter at that time. One data block being of the above-described arrangement constitutes one edge detection data. Subsequent detections of the waveform edge portion are made at the time T2 of the signals S1 and S3. When two or more waveform edge portions are detected in two or more logical signals at the same time as described above, such an arrangement is adopted that the edge detection data are recorded in a preset order of priority, e.g. an order from a signal being junior in number to senior. In consequence, the edge detection data are recorded in the order of the logical signals S1 to S3 as shown in data blocks 102 and 103. More specifically, the data block 101 includes the signal label S1 specifying the logical signal, a logical level 0 after the transition and the counter value T2 showing the time then. Similarly, the data block 103 includes the signal label S3 specifying the logical signal, a logical label 1 after the transition and the time T2 then. The edge detection data are successively recorded as described above.

In consequence, according to this method, the time, at which the logical levels are caused to transit, are recorded and the waveforms can be accurately duplicated and the data accumulating area can be reduced as much as possible.

There has been proposed no effective method of producing logical signals. For example, the reverse utilization of a data sampling method of a clock interval adopted in the aforesaid logic analyzer, for reproducing data at a predetermined interval is disadvantageous in producing signals with high time accuracy due to a low data transfer capability.

Further, in analyzing the aforesaid engine control system, as proposed by the applicant in Japanese Patent Application No. 26722/1983 for example, such a proposal may be made that the actual signals of the engine are recorded by use of a digital signal converter for detecting the transition time of the logical level of digital signals and the logical level after the transition and converting the same into data for recording, and an analogue-digital converter (hereinafter referred to as an "A/D converter") for converting an analogue signal into a digital signal to produce data for recording.

In order to duplicate the troubles of rare occurrence, it is necessary that a simulation function for reproducing the actual signals of the engine is provided, so that the measured and recorded signals can be reproduced in the waveforms indentical with those of the measured signals. For this purpose, it may be proposed that, in addition to the digital signal converter and the A/D converter as aforesaid, there are provided:

a digital signal producer for changing the logical level of the produced digital signal so that the logic level of the produced digital signal after transition is made to be the logic level of the aforesaid data after transition in accordance with the transition time of the logical level of the data for producing the digital signals and the logical level after the transition, both of which are read out of a storage device at the time, when the current time after the start of production of signals coincides with the aforesaid transition time of the logical level and a digital-analogue converter (hereinafter referred to as a "D/A converter") for returning the digital data for producing an analogue signal, which is read out of the storage device, to an analogue signal to produce the analogue signal.

However, when clocks for exclusive use are provided on the digital signal converter, the A/D converter, the digital signal producer and the D/A converter, respectively, as usually adopted to prevent the delay in transmission, even if all of these clocks are synchronized at the time of the start of recording or reproducing, and the recording and reproducing of the actual signals of the engine are started at the same time, a shift in time occurs between the digital signal and the analogue signal due to a difference between the clocks during the recording or reproducing of scores of minutes, so that it becomes disadvantageously impossible to accurately record or reproduce the actual signals of the engine.

More specifically, when knock signals of the engine are recorded for example, it is necessary to record output waveforms of a knock sensor as shown in FIG. 23(A) in analogue, and also digitally record a masking signal as shown in FIG. 23(B) being closed at a position not close to the ignition timing, for preventing an error in judgment of knocking due to a cause other than the knocking. In this case, when the clock of the output waveform of the knock sensor as being an analogue signal accurately coincides with the clock of the making signal as being a digital signal, then both signals can be accurately recorded or reproduced. However, when the clock of the analogue signals is independently formed of the clock of the digital signals and the frequencies therebetween are shifted, the both signals become out of synchronism, the masking signal is delayed as indicated by broken lines in FIG. 23(B) for example, whereby such an unusual waveform is obtained that the ignition timing is advanced at the succeeding ignition after an occurrence of a knocking, thus presenting a disadvantage that an accurate recording or reproducing cannot be performed.

SUMMARY OF THE INVENTION

The present invention has been developed to obviate the above-described disadvantages of the prior art and has as its first object the provision of the method of storing and indicating signals, capable of indicating changes in input and output signals of the computer coinciding in timing with changes in the internal information of the computer, and consequently, capable of properly analyzing the operating condition of the computer.

A second object of the present invention is to provide a method of producing logical signals, capable of accurately producing logical signals by a small quantity of data.

A third object of the present invention is to provide an apparatus for recording signals, capable of accurately recording digital signals and analogue signals for a long period of time.

A fourth object of the present invention is to provide an apparatus for recording and producing signals, capable of accurately recording and producing digital signals and analogue signals for a long period of time.

To achieve the above-described first object, the present invention contemplates that, in a method of storing and indicating signals, wherein internal information of a computer, which are stored in a random access memory, a register and the like, are stored and indicated together with input and output signals of the computer, as the gist thereof shown in FIG. 1, the method includes:

a step of reading out the internal information of the computer;

a step of detecting the time at which the internal information is read out;

a step of storing the internal information added thereto with time information; and a step of indicating the internal information in synchronism with input and output signals of the computer by the time information.

A specific form of the present invention is of such an arrangement that said read-out of the internal information is performed at a predetermined cycle, so that the read-out of the internal information can be very easily performed.

Or, another specific form of the present invention is of such an arrangement that said read-out of the internal information is performed by seizing the time of write-in or read-out of the internal information, so that the internal information can be accurately stored by a small quantity of data.

To achieve the above-described second object, the present invention contemplates that, in a method of producing signals for producing logical signals, as the gist thereof is shown in FIG. 2, the method includes:

a step of reading out data for producing the logical signals recorded in such a manner that a transition time of a logical level is associated with the logical level after the transition;

a step of judging as to whether the current time after the start of production of the logical signal coincides with the transition time of the logical level of the aforesaid data or not; and a step of changing the logical level of the produced logical signal such that the logical level after the transition is made to be the logical level after the transition of the data when the current time coincides with the transition time of the logical level.

To achieve the above described third object, the present invention contemplates that, as the gist and the arrangement thereof are shown in FIG. 3, in an apparatus for recording signals, the apparatus comprises:

digital signal converting means for seizing a transition time of a logical level of a digital signal and the logical level after the transition and converting the same into data for recording;

an A/D converting means for converting an analogue signal into a digital signal to provide data for recording;

storing means for recording the data for recording outputted from the digital signal converting means and the A/D converting means; and single clock generating means for generating a common clock signal for the digital signal converting means and the A/D converting means.

Furthermore, to achieve the above-described fourth object, the present invention contemplates that, as the gist and the arrangement thereof are shown in FIG. 4, in an apparatus for recording and producing signals, the apparatus comprises:

digital signal converting means for seizing a transition time of a logical level of a digital signal and the logical level after the transition and converting the same into data for recording;

A/D converting means for converting an analogue signal into a digital signal to produce data for recording;

storing means for recording the data for recording outputted from the digital signal converting means and the A/D converting means;

digital signal producing means for changing a logical level of a produced digital signal in accordance with the transition time of the logical level of the data for producing the digital signals and the logical level after the transition, both of which are read out of the storing means, such that, when the current time after the start of production of signals coincides with the aforesaid transition time of the logical level, the logical level after the transition is made to be the logical level of the aforesaid data after the transition;

D/A converting means for returning data for producing an analogue signal read out of the storing means to an analogue signal to produce an analogue signal; and single clock generating means for generating a common clock signal for the digital signal converting means, the A/D converting means, the digital signal producing means and the D/A converting means.

According to the present invention, in storing the internal information of the computer, which is stored in the random access memory, the register and the like together with the input and output signals of the computer and indicating the same, the internal information of the computer, which is added thereto with the time information, at which the internal information is read out, is stored, and the input and output signals of the computer are synchronized with the time information to indicate the internal information, so that the changes of the internal information corresponding to the changes of the input and output signals, can be indicated in synchronism with each other. In consequence, the operating conditions of the computer can be properly analyzed.

Further, according to the present invention, in producing the logical signal, the data for producing the logical signal, which are recorded in such a manner that the transition time of the logical level are associated with the logical level after the transition, are read out, and the logical level of the produced logical level is changed such that the logical level after the transition is made to be the logical level after the transition of the data when the current time after the start of production of the logical signal coincides with the transition time of the logical level of the data, so that the logical signal can be accurately produced with a small quantity of the data. In other words, the transition time of the logical level and the logical level after the transition are associated with each other and recorded, so that the logical signal can be accurately produced. Furthermore, in the case of the multi-channels or of a low frequency of occurrence of edges, the quantity of the recorded data for producing the logical signal can be decreased. Further, the quantity of the recorded data for producing the logical signals is small, so that the logical signal can be easily inputted by an operator through a keyboard. Additionally, when grid noises and the like are overlappingly inputted to the signals by an operator, the influence exerted on grid noises and the like can be easily checked.

According to the present invention, further, the clocks of the digital signal converting means and of the A/D converting means are made to be the common clock generated by the single clock generating means, the both means can be actuated accurately in synchronism with the each other for a long period of time. In consequence, even if the recording is performed for a long period of time, the clock of the digital signals and the clock of the analogue signals recorded by the storing means are not shifted from each other, so that an accurate recording can be performed.

Furthermore, according to the present invention, not only the clocks of the digital signal converting means and of the A/D converting means in the recording system, but also the clocks of the digital signal producing means and of the D/A converting means in the signal producing system are all made to be the common clock generated by the single clock generating means, so that all of the digital signal converting means, the A/D converting means, the digital signal producing means and the D/A converting means are actuated accurately in synchronism with each other for a long period of time. In consequence, not only the means in the recording system but also the means in the signal producing system are entirely synchronized, and, even if the recording and the signal producing are performed for a long period of time, the clocks of the produced signals are not shifted from one another, so that the recording and the signal producing can be accurately performed.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 11 is a chart showing an example of the arrangement of the storage data in the first embodiment;

FIG. 14 is a chart showing the arrangement of the storage data in the second embodiment;

DETAILED DESCRIPTION OF THE INVENTION

Detailed description will hereunder be given of the embodiments of the present invention with reference to the drawings.

Figure 5:
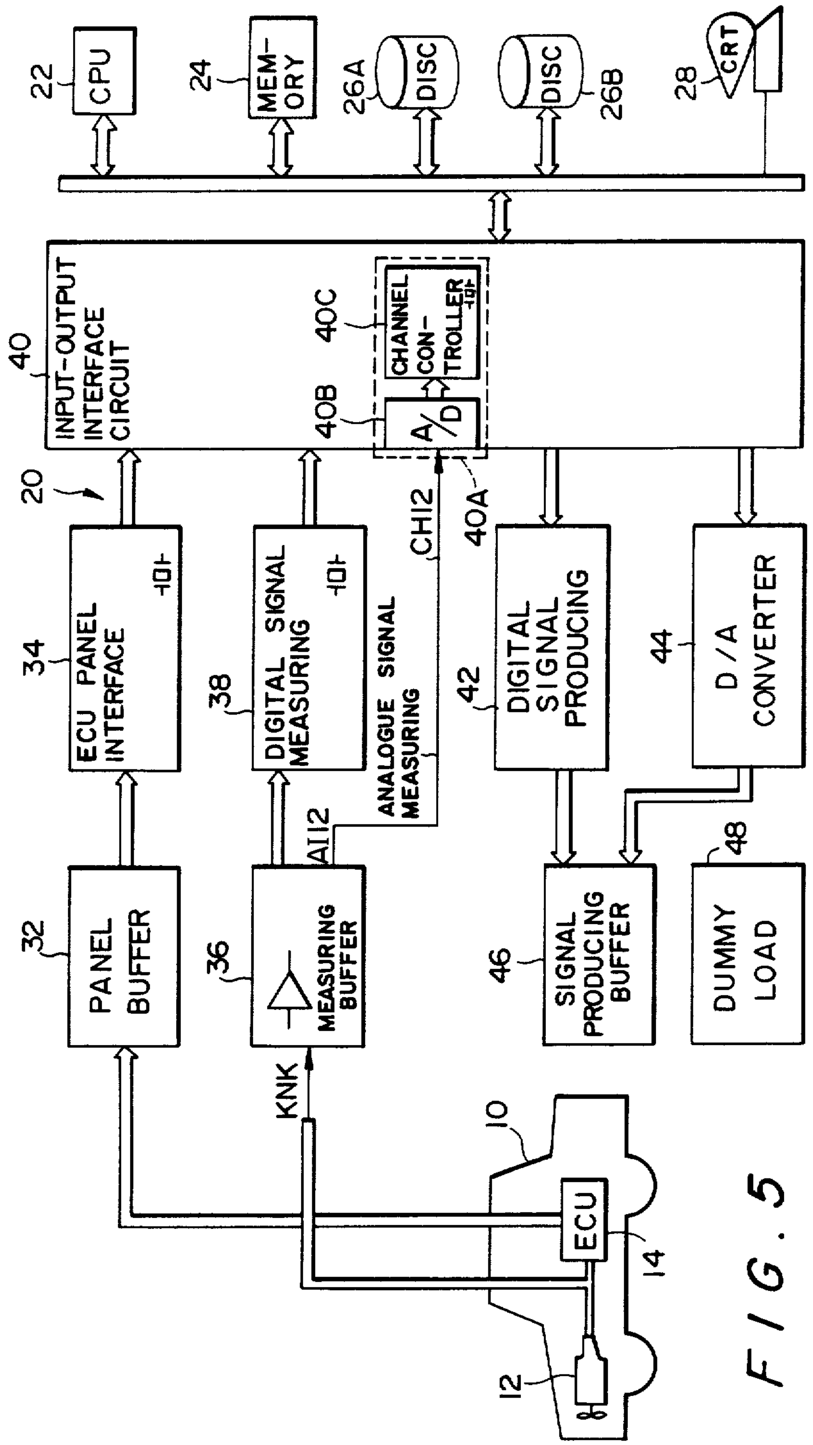
FIG. 5 is a block diagram showing the arrangement of a first embodiment of the engine control simulator to which is applied the present invention.

As shown in FIG. 5, the first embodiment of the present invention is applied to an engine control simulator 20 for analyzing the operating conditions of the ECU 14 for controlling an engine 12 mounted onto a motor vehicle 10.

The engine control simulator 20 comprises:

A central processing unit (hereinafter referred to as a "CPU") for performing various calculation and processing;

a memory 24 being an internal storage for storing operation data and the like;

disc devices 26A and 26B being external storages for storing data for recording, data for producing signals and the like;

a display device (hereinafter referred to as a "CRT") 28 for reproducing and displaying waveforms;

an ECU panel interface 34 for reading information from a random access memory (hereinafter referred to as a "RAM") and a register of the ECU 14 through a panel buffer 32;

a digital signal measuring unit 38 for detecting the transition time of the logical level of digital signals and the logical level after the transition out of the actual signals of the engine 12, which are inputted through a measuring buffer 36 and converting the same into data for recording;

an input-output interface circuit 40 incorporated therein an A/D converter 40A, for converting analogue signals inputted through the measuring buffer 36 into digital signals as data for recording;

a digital signal producing unit 42 for changing the logical level of the produced digital signal in accordance with the transition time of the logical level of the data for producing the digital signals and the logical level after the transition, both of which are read out of the disc device 26B, such that, when the current time after the start of production of signals coincides with the transition time of the logical level, the logical level after the transition is made to be the logical level of the data after the transition;

a D/A converter 44 for returning data for producing analogue singals read out of the disc device 26B to analogue signals to produce analogue signals;

a signal producing buffer 46 delivering signals produced by the digital signal producing unit 42 and the D/A converter 44 at the time of simulation to the ECU 14 under the study of simulation; and a dummy load 48 including injectors for example, connected to the ECU 14 at the time of simulation.

Figure 6:
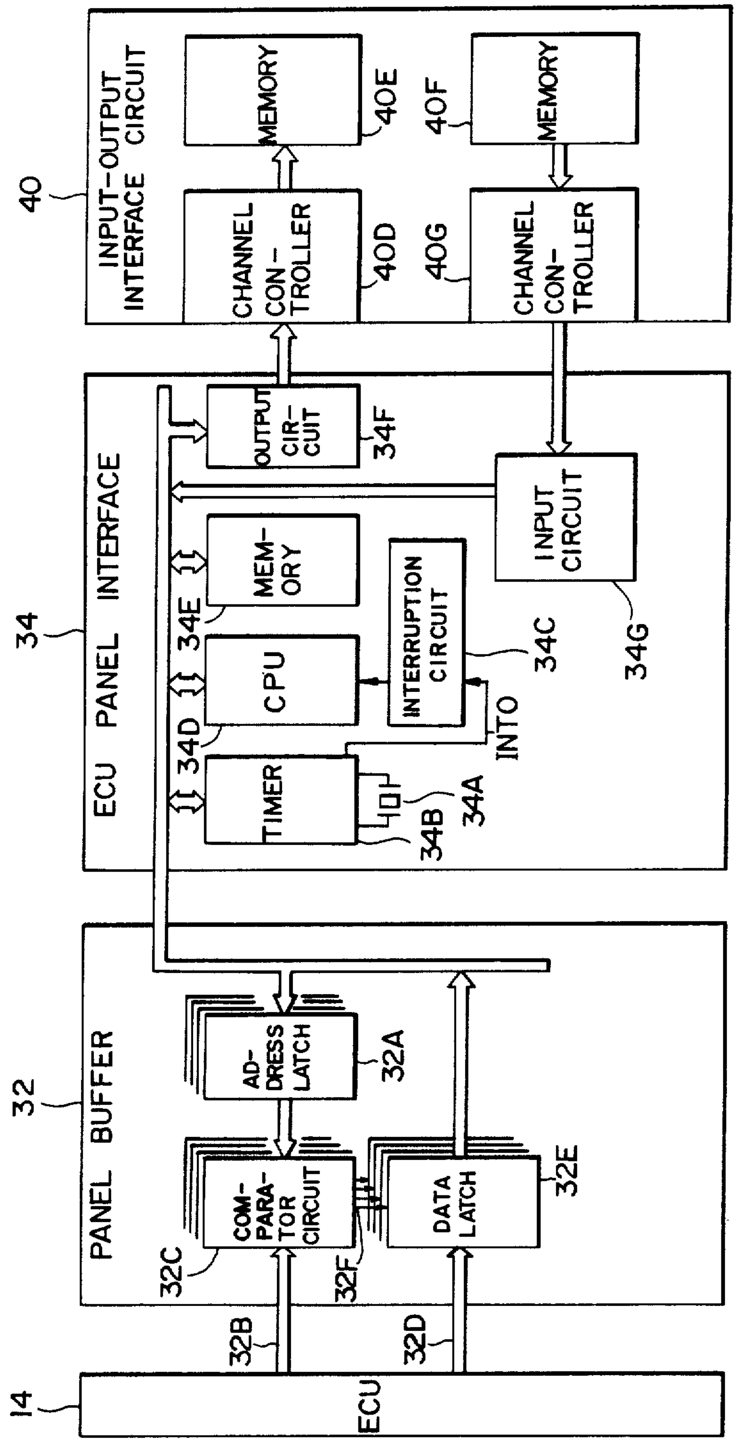
FIG. 6 is a block diagram showing the arrangement of the panel buffer and the engine control unit (hereinafter referred to "ECU") panel interface used in the first embodiment.

As detailedly shown in FIG. 6, the panel buffer 32 comprises:

address latch circuits 32A in which address information is set;

comparator circuits 32C for comparing an address set in the address latch circuits 32A with an address on an address bus 32B; and data latch circuits 32E for latching data on a data bus 32D by an address coincidence signal 32F when a coincidence is detected by the comparator circuit 32C.

There are prepared each 15 of the address latch circuits 32A, the comparator circuits 32C and the data latch circuits 32E for example.

As detailedly shown also in FIG. 6, the ECU panel interface 34 comprises:

a timer 34B controlled by a clock 34A;

a CPU 34D for setting an address of the internal information desired to read out in the address latch circuits 32A of the panel buffer 32 before the start of the measuring and for reading out time data of the timer 34B and data of the data latch circuits 32E in synchronism with interrupt signals of every predetermined time interval, which is delivered from the timer 34B through an interruption circuit 34C, after the start of the measuring;

a memory 34E;

an output circuit 34F for outputting the information read out to a memory 40E of the input-output interface circuit 40 through a channel controller 40D thereof; and an input circuit 34G for taking in address information and the like inputted from a memory 40F of the input-output interface circuit 40 through a channel controller 40G thereof.

The clock 34A of the timer 34B has the same frequency as the clock of the digital signal measuring unit 38 for measuring input and output signals of the ECU 14 simultaneously and the clock of the A/D converter 40A, and starts counting simultaneously with the start of measuring.

Figure 7:
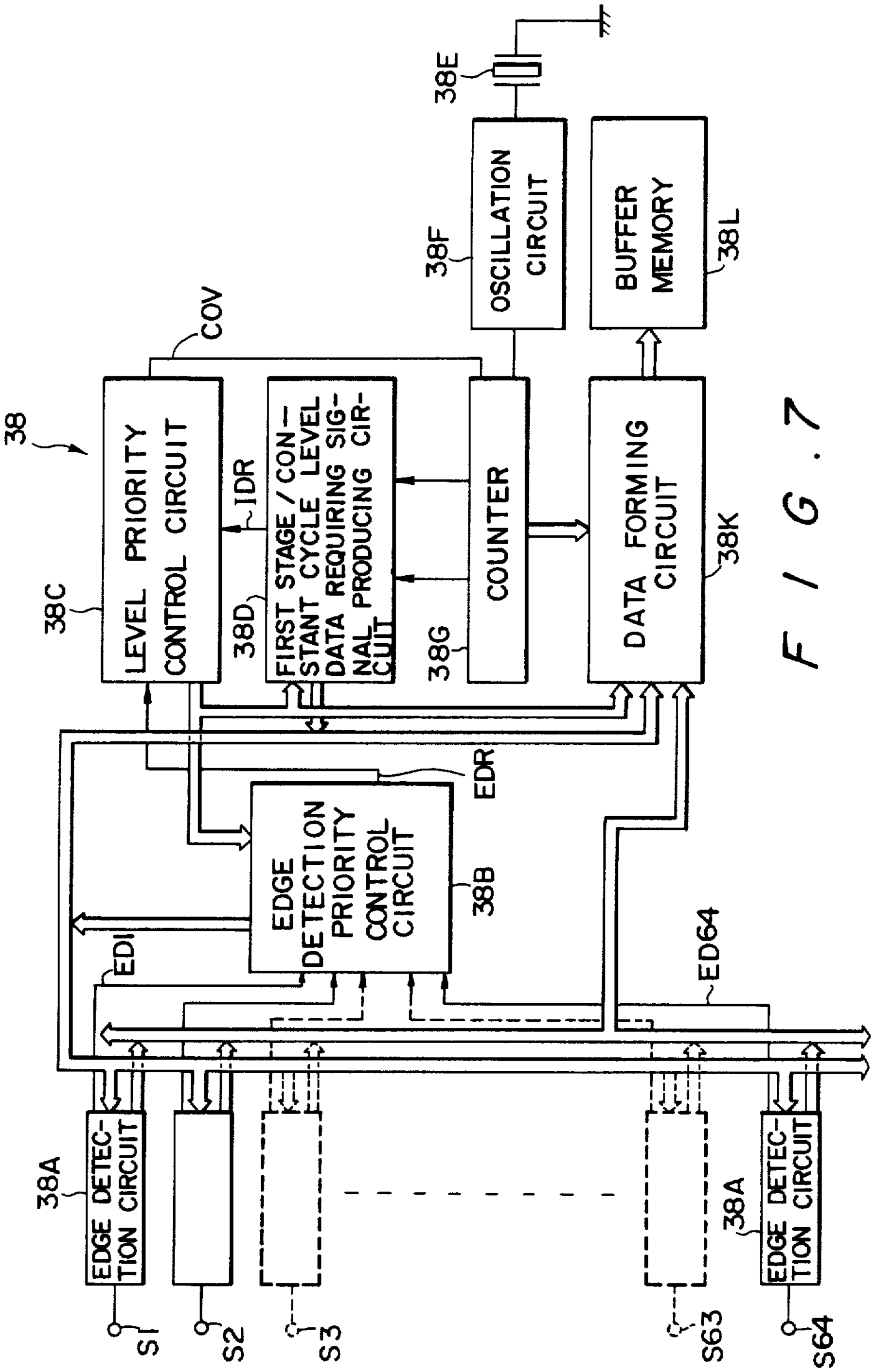
FIG. 7 is a block diagram showing the arrangement of the digital signal measuring unit used in the first embodiment.

As detailedly shown in FIG. 7 for example, the digital signal measuring unit 38 comprises:

edge detection circuits 38A for detecting the transition of the logical level of the respective digital signals, i.e. edges;

an edge detection priority control circuit 38B for determining the priority order of data recording such for example as the order from junior to senior, when edge portions are detected simultaneously in a plurality of edge detection circuits 38A;

a level priority control circuit 38C for outputting a priority control signal to the edge detection priority control circuit 38B in accordance with a predetermined priority order when two or more data recording are in conflict with one another out of data of three types including edge detecting data, first time/constant interval level data for ascertaining the logical level at the first time and at constant intervals and overflow data indicating the overflow times of a counter 38G;

a first time/constant interval level data requiring signal producing circuit 38D for producing a first time/constant interval level data requiring signal at the first time and at the constant interval;

an oscillation circuit 38F controlled by a quarz oscillator 38E;

a counter 38G being for counting clock signals inputted from the oscillatin circuit 38F;

a data forming circuit 38K for obtaining data of three types including the edge detecting data, the first time/constant interval level data and the overflow data from a data bus and forming data; and a buffer memory 38L for provisionally storing data when a multiplicity of data are formed at once.

As detailedly shown in FIG. 5, the A/D converter 40A comprises:

an A/D converting section 40B for converting analogue signals inputted through the measuring buffer 36 into digital signals; and a channel controller 40C for taking in the digitally converted signals by the A/D converting section 40B.

Figure 8:
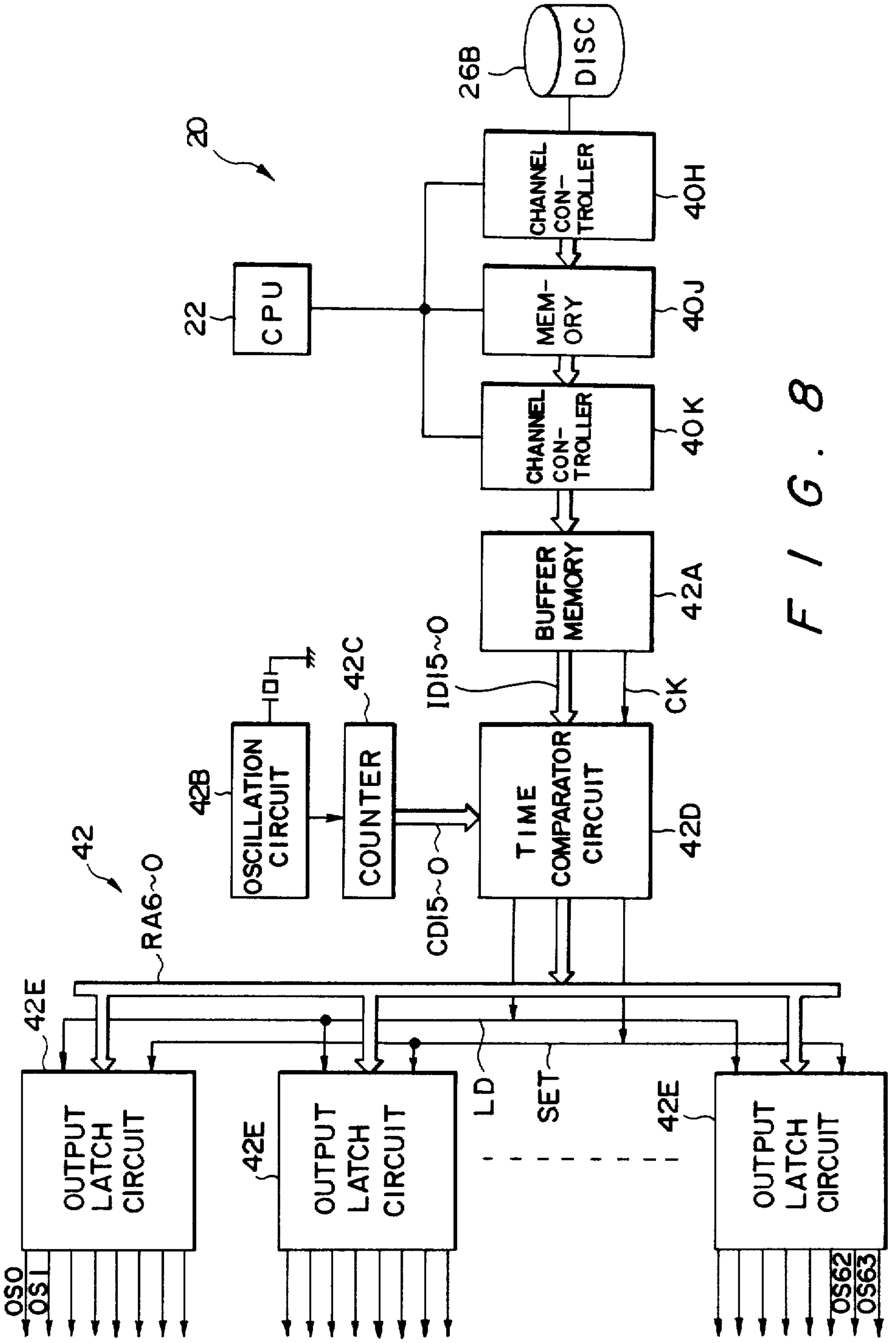
FIG. 8 is a block diagram showing the arrangement of the digital signal producing unit used in the first embodiment.

As detailedly shown in FIG. 8, the digital signal producing unit 42 comprises:

a buffer memory 42A for provisionally storing data for producing logical signals, which are read out of the disc device 26B by channel controllers 40H, 40K and a memory 40J, which are controlled by a CPU 22 of the engine control simulator 20 and for preventing the delay in process when a multiplicity of data are produced at once;

an oscillation circuit 42B for generating clock signals;

a counter 42C for counting outputs of the oscillation circuit 42B to count the current time after the start of production of the logical signals;

a time comparator circuit 42D for comparing the data of the transition time in the buffer memory 42A with the current time being counted by the counter 42C and producing an output at the time of coincidence; and output latch circuits 42E for chaning the logical level of a specific port corresponding to a signal label datum in the buffer memory 42A so as to coincide with the data of lagical level in the buffer memory 42A in response to an output from the time comparator circuit 42D, to thereby produce logical signals.

Figure 9:
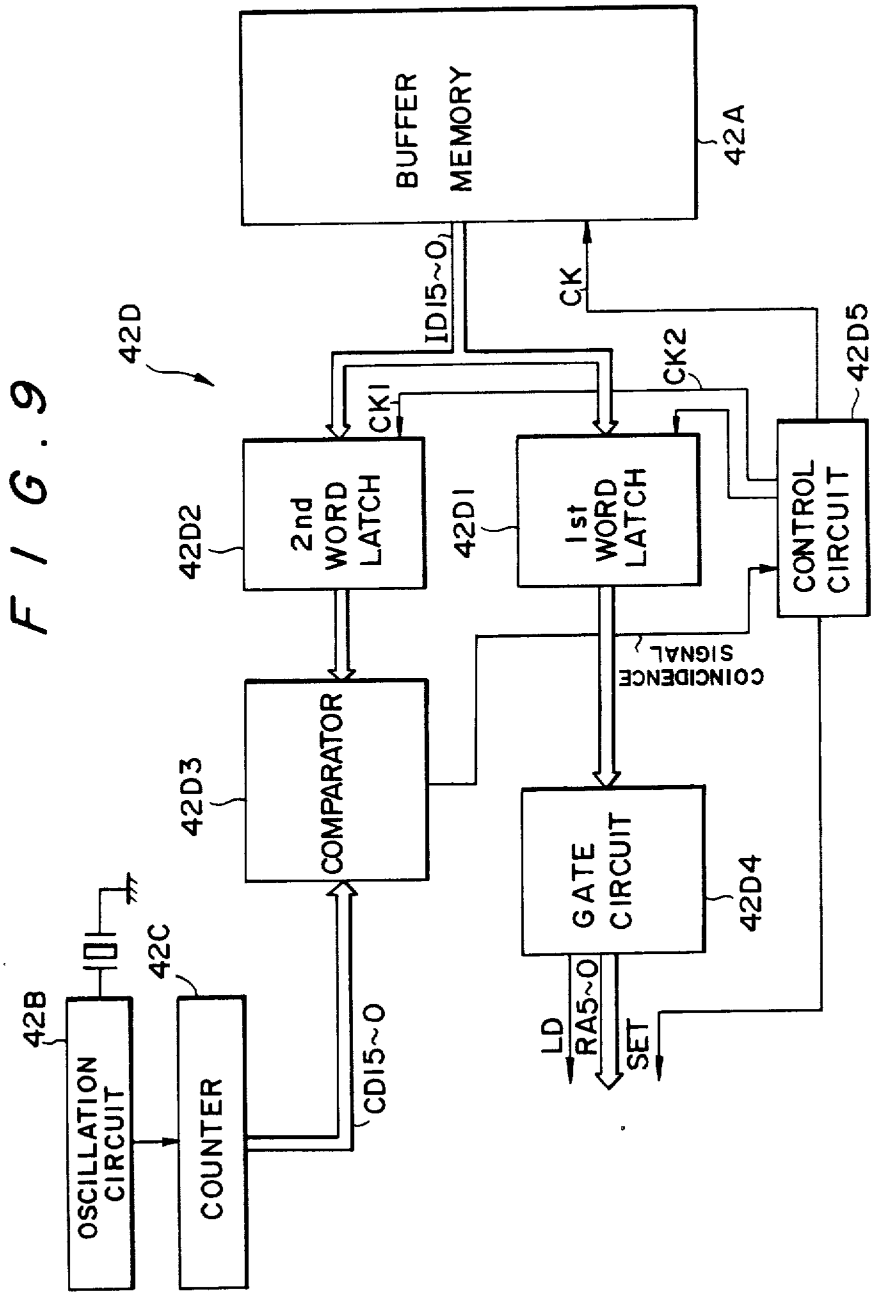
FIG. 9 is a block diagram showing the arrangement of the time comparator circuit used in the aforesaid digital signal producing unit.

As detailedly shown in FIG. 9, the time comparator circuit 42D comprises:

a first word latch 42D1 and a second word latch 42D2 for dividing data delivered from the buffer memory 42A into a first word (signal label data and logical level data) and a second word (transition time data) and latching the same, respectively;

a comparator 42D3 for comparing the transition time data latched by the second word latch 42D2 with the current time inputted from the counter 42C and outputting a coincidence signal at the time of coincidence of the both;

a gate circuit 42D4 for producing output signals RA5-0 to select one of output latch circuits 42E and output ports by the signal label data latched by the first word latch 42D1 and for outputting an output signal LD to set the logical level of the selected output port by the logical level data latched by the first word latch 42D1; and a control circuit 42D5 for outputting a logical level setting timing signal SET to the selected output latch circuit 42E in response to the coincidence signal inputted from the comparator 42D3.

Figure 1:
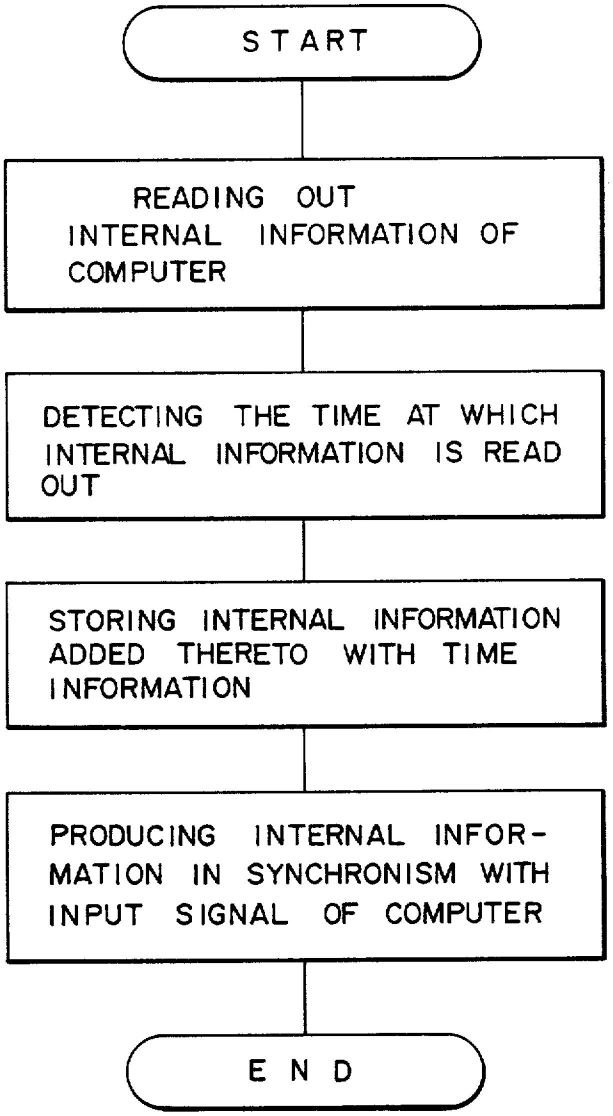
FIG. 1 is a flow chart showing the gist of the method of storing and indicating signals according to the present invention.
Figure 2:
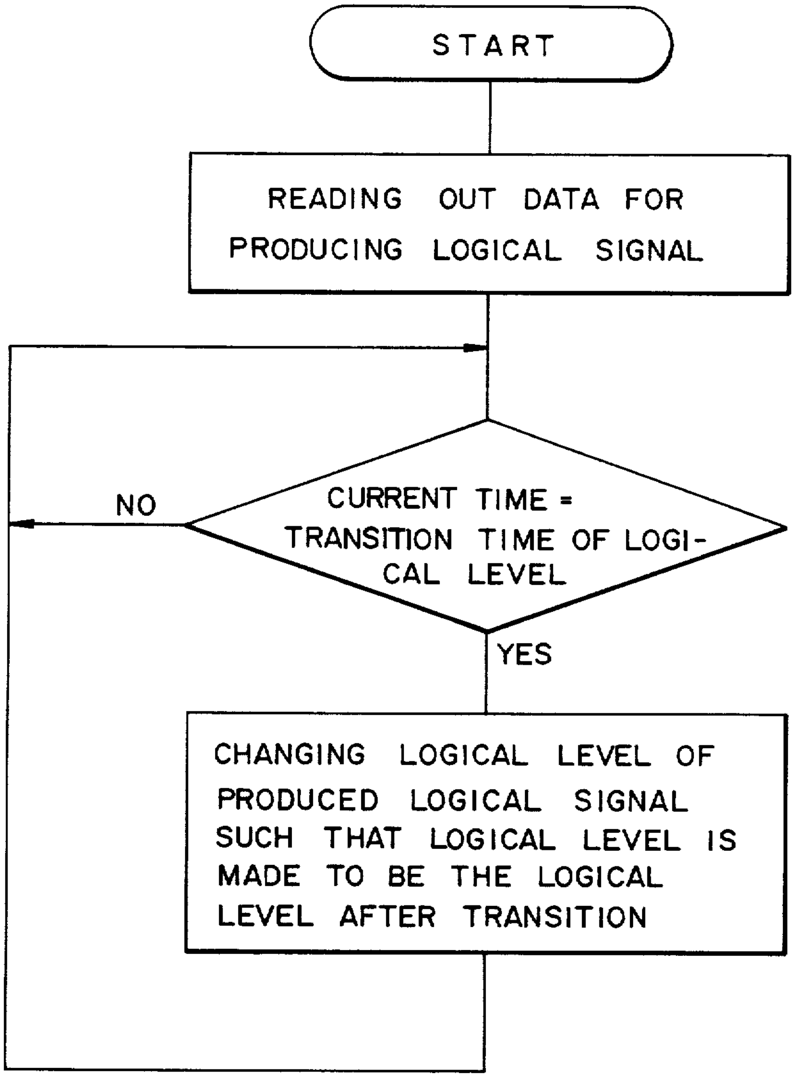
FIG. 2 is a flow chart showing the gist of the method of producing signals according to the present invention.
Figure 3:
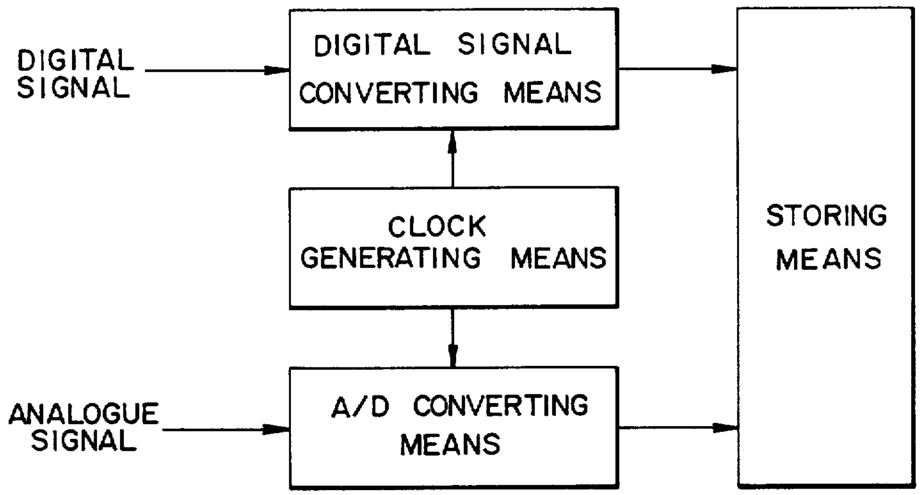
FIG. 3 is a block diagram showing the gist and the arrangement of the apparatus for recording signals according to the present invention.
Figure 10:
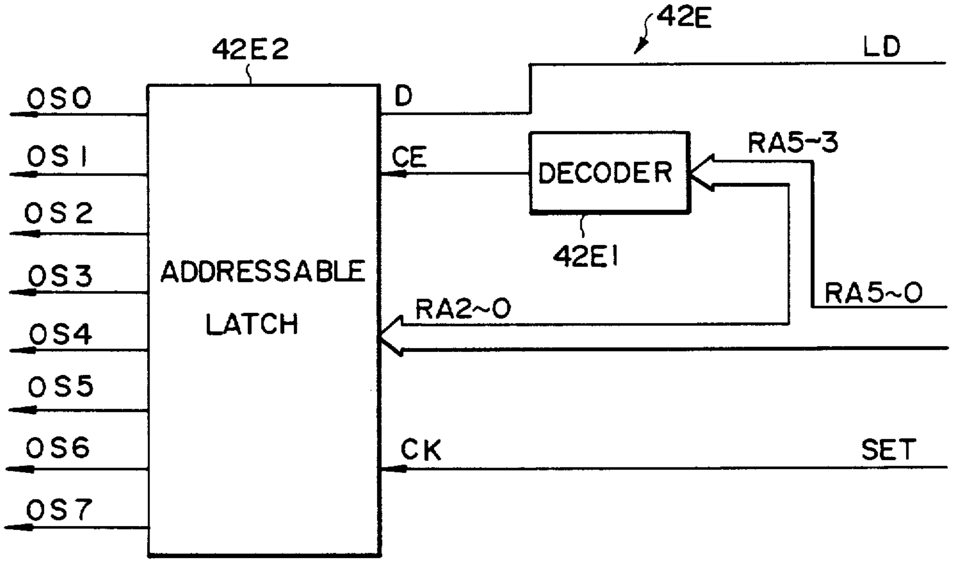
FIG. 10 is a block diagram showing the arrangement of the output latch circuit used in the aforesaid digital signal producing unit.
Figure 4:
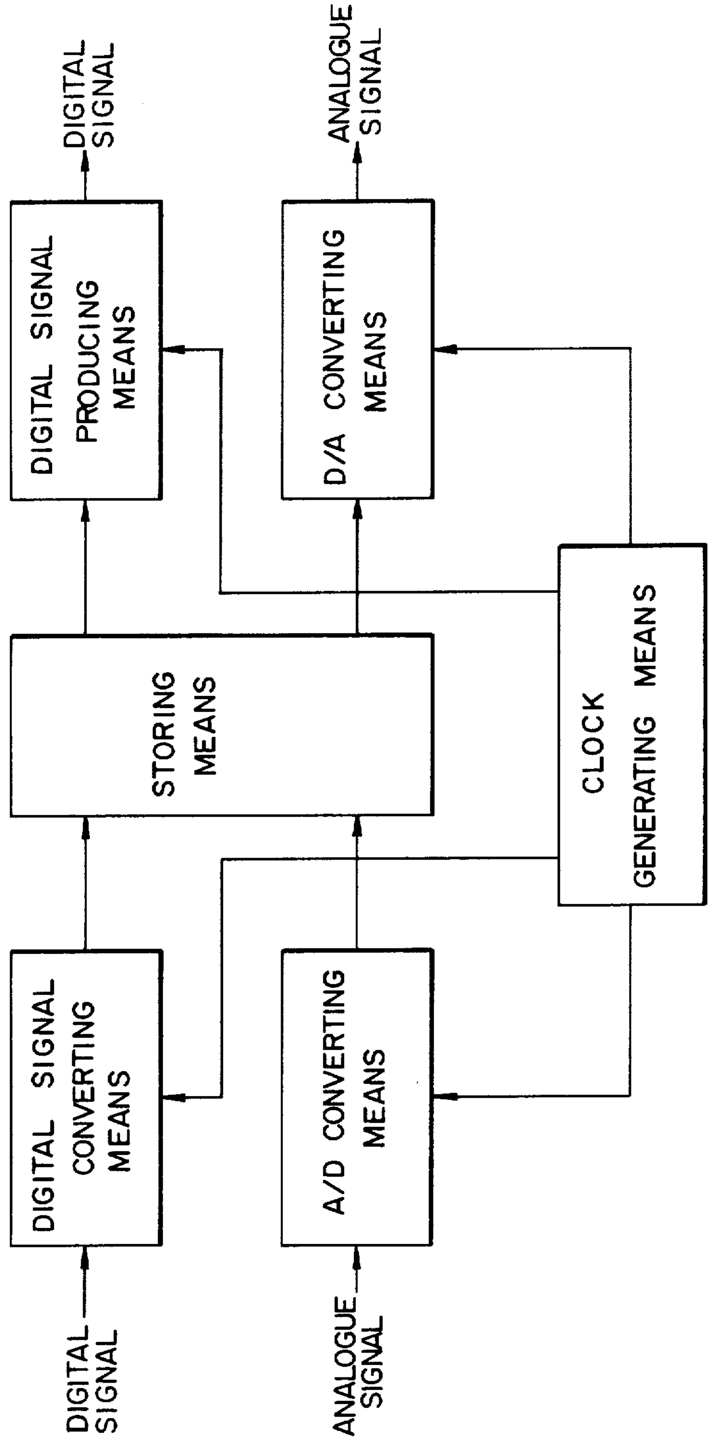
FIG. 4 is a block diagram showing the gist and the arrangement of the apparatus for recording and producing signals according to the present invention.

As detailedly shown in FIG. 10, each output latch circuit 42E comprises:

a decoder 42E1 for decoding output signals RA5-3 inputted from the gate circuit 42D4 of the time comparator circuit 42D; and an addressable latch 42E2 for chaning the logical level of an output signal in response to an output from the decoder 42E1 and outputs from the gate circuit 42D4 and the control circuit 42D5 of the time comparator circuit 42D.

Firstly, description will be given of the method of storing and indicating the internal information of the computer in this first embodiment.

In the first embodiment, the internal information is read out at constant intervals and stored accordingly. Therefore, the type of stored data of the internal information of the computer taken out of the data latch circuits 32E in this first embodiment becomes as shown in FIG. 11, for example". Referring to the drawing, the first word and the second word are time data when an interrupt signal INTO obtained from the clock 34A is produced, and the third word to the seventeenth word are monitor data of address desired to read out, e.g. 15 monitor data.

Figure 12:
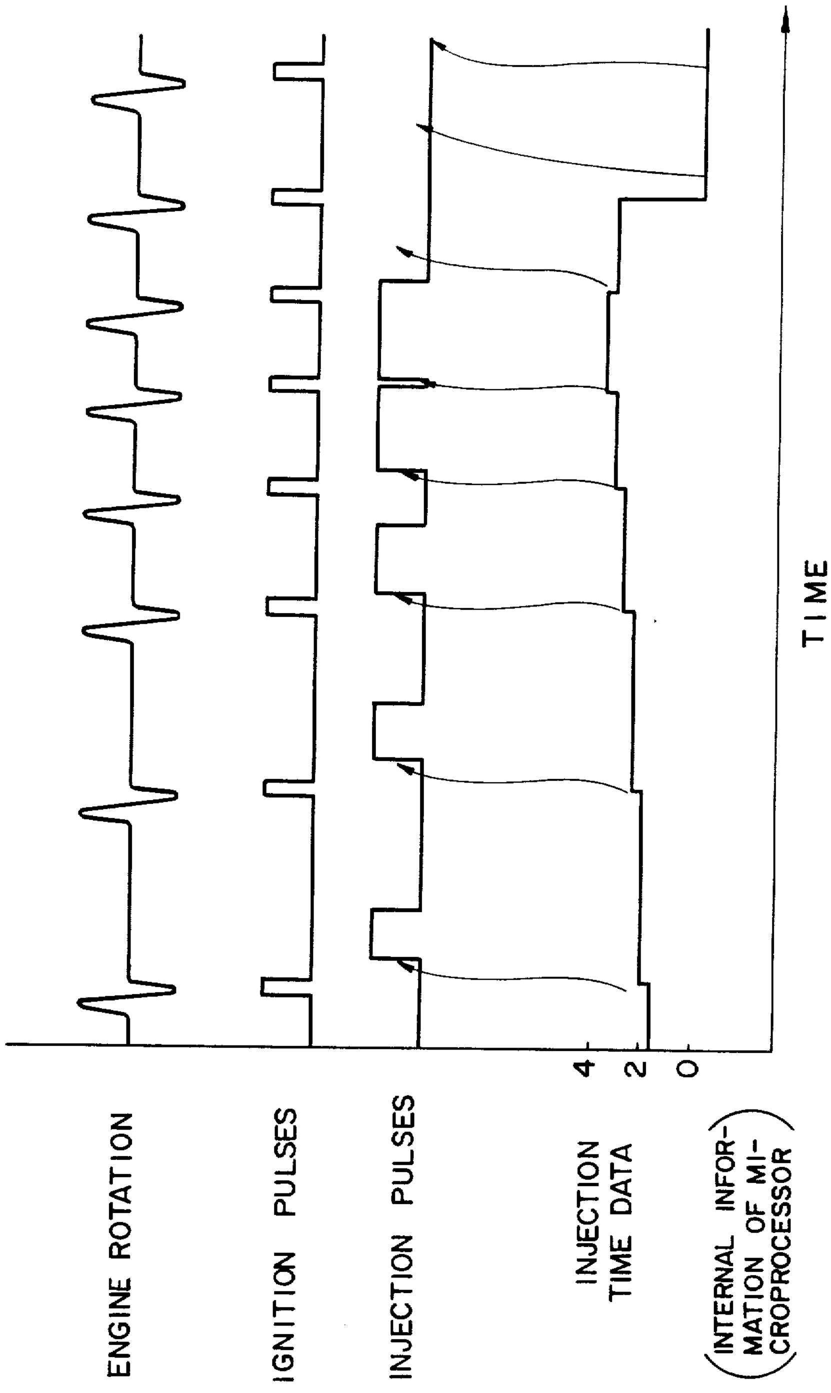
FIG. 12 is a chart showing an example of indicated waveforms of the engine rotation signal, the ignition pulse signal, the injection pulse singal and the injection time duration data signal in the first embodiment.

FIG. 12 shows an example of the display of the measured data in this first embodiment. Here, all of an engine rotation data, an ignition pulse data and an injection pulse data are indicated from the measured data of the input and output signals, and an injection time data is obtained from the internal information of the microprocessor of the ECU 14. As apparent from the drawing, there is indicated the injection time data as being the internal processing information of the computer, which is synchronized with the injection pulse signal as being the input and output signal.

Figure 13:
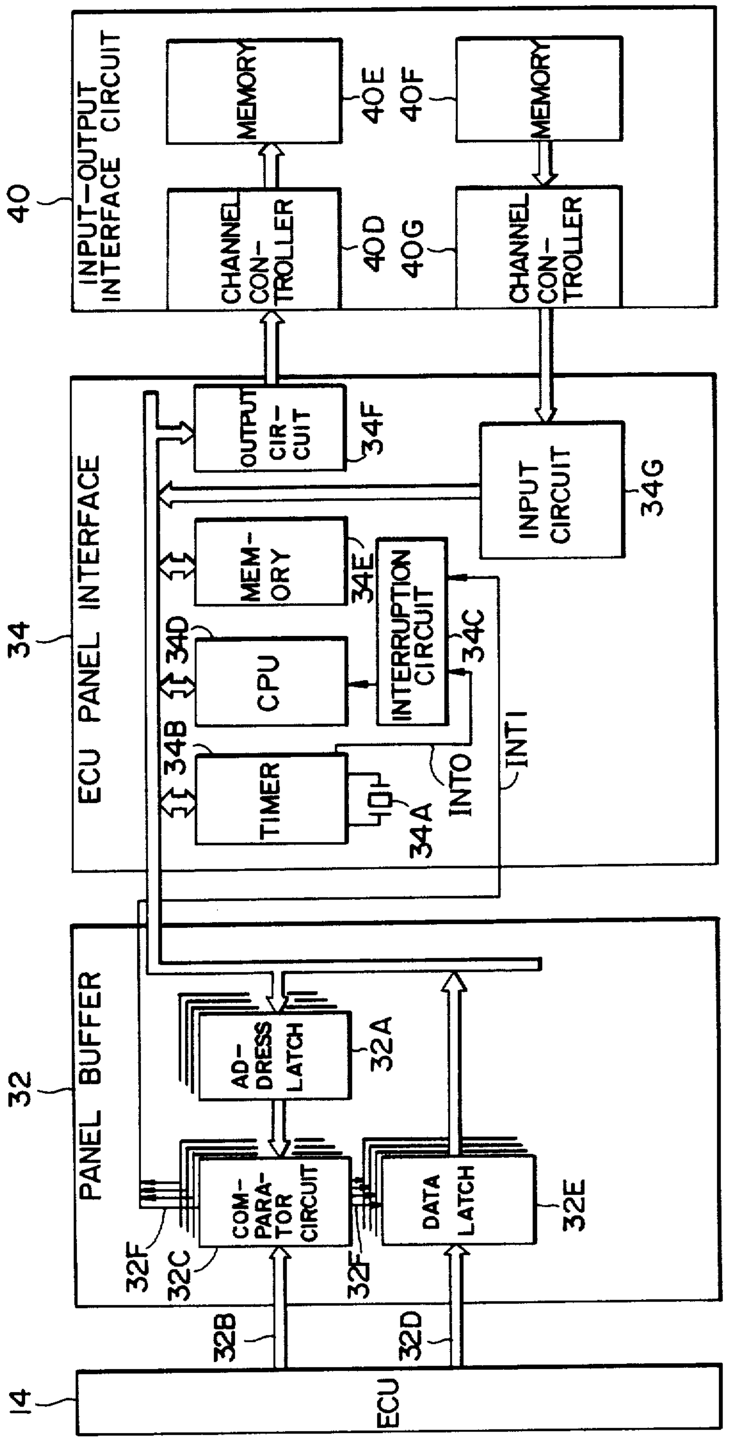
FIG. 13 is a block diagram showing the arrangements of the panel buffer and the ECU panel interface used in a second embodiment of the engine control simulator to which is applied the present invention.

In this first embodiment, the internal information is read out at constant intervals, so that the read-out can be very easily performed. Additionally, the method of reading out the internal information need not necessarily be limited to this, and, for example, as in the second embodiment shown in FIG. 13, the read-out of the internal information can be performed by an interrupt INT1 using the address coincidence signal 32F at the time of write-in or read-out of the internal information. In this second embodiment, the time of data change can be surely detected, and moreover, the type of data comes to be one as shown in FIG. 14 for example, so that the quantity of data can be decreased to a considerable extent. In FIG. 14, the first word and the second word are a time data, the third word is an address data, and the fourth word is a monitor data.

Description will hereunder be given of the method of producing the logical signals in the first embodiment with reference to FIG. 8.

The data for producing the logical signals held in the disc device 26B by measuring and storing the actual signals of the engine or through inputting and storing by an operator through a keyboard for example, are passed through the memory 40J and delivered to the buffer memory 42A through the agency of the channel controllers 40H and 40K in a process reverse to the case of recording. The transition time data of the buffer memory 42A is compared with the current time counted in the counter 42C by the time comparator circuit 42D, and, when the both coincide with each other, the logical level of a specific port of the output latch circuit 42E is caused to tansit and a signal associated with the recorded data is produced.

In the first embodiment, the process of producing the signals according to the present invention is carried out by use of a hardware arrangement, so that the processing at high speed can be easily performed. Additionally, when the computer is a high speed one, the process of producing the signals according to the present invention can be carried out by use of a software arrangement.

The process of producing the signals according to the present invention is suitably applicable to the case where the logical signals of the multi-channels and having a low frequency of occurrences of the edges like the actual signals of the engine are reproduced, however, the process of producing the signals according to the present invention need not necessarily be limited to this, and, it is evident that it can be applied to the duplication or reproduction of the logical signals of one channel or the logical signals having a high frequency of occurrences of the edges. Also, in this case, the effect of decreasing the data in number is somewhat lowered, however, the time accuracy of the produced signals is improved to a considerable extent.

In the first embodiment, the clock 34A in the ECU panel interface 34 for adding the time information to the internal information is formed independently of each of the clock 38E in the digital signal measuring unit 38 and the clock in the A/D converter 40A, so that the arrangement can be simplified. Additionally, as in the third embodiment shown in FIGS. 15 to 17, the clock 34A in the ECU panel interface 34 and the clock in the A/D converter 40A are dispensed with and, for example, it is possible to make the samplings externally synchronized by external clocks CLK1 and CLK2, both of which are generated from one and the same clock in the digital signal measuring unit 38.

Figure 16:
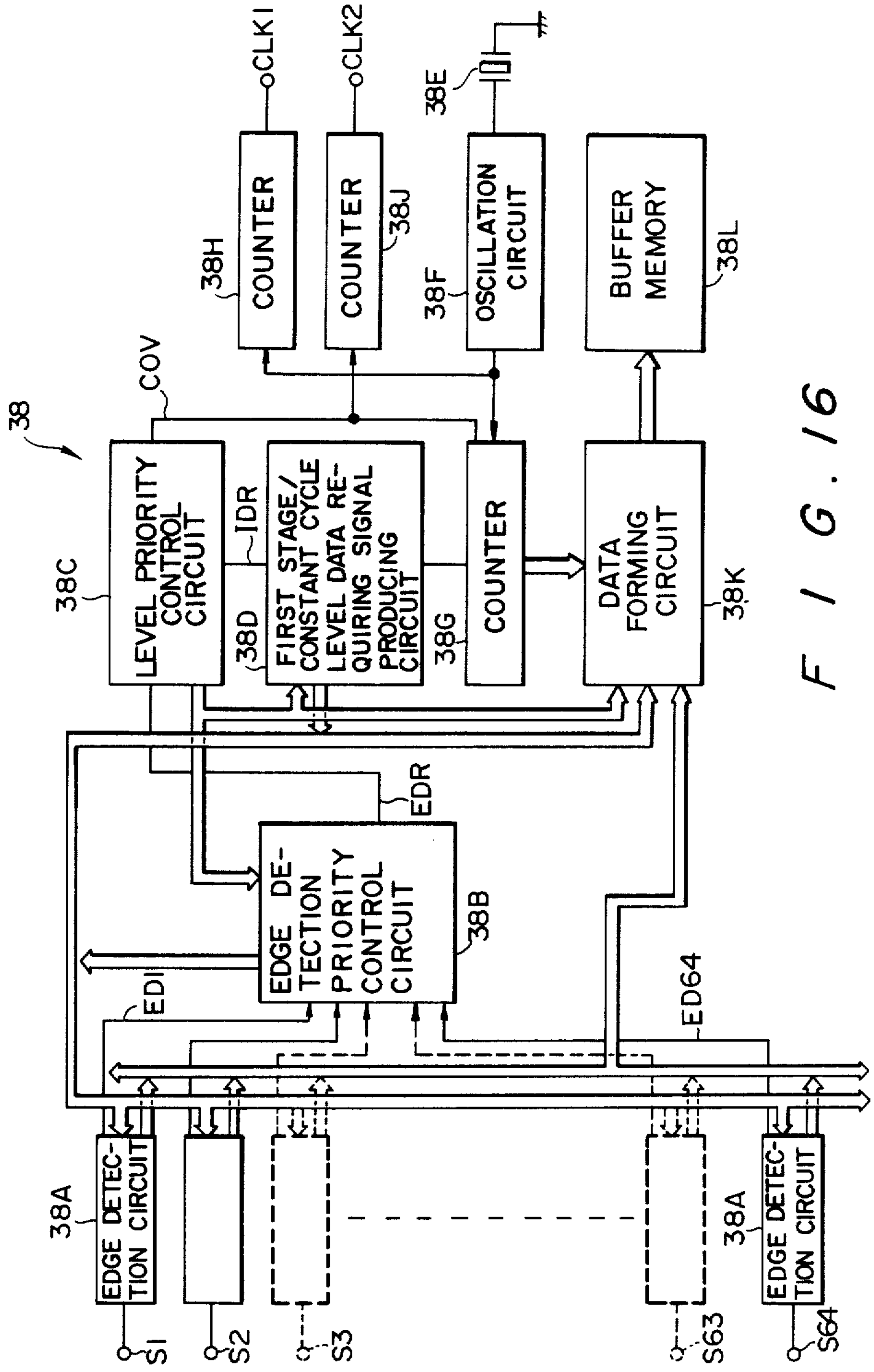
FIG. 16 is a block diagram showing the arrangement of the digital signal measuring unit used in the third embodiment.

For this purpose, as shown in FIG. 16, in addition to the arrangement shown in the first embodiment, the digital signal measuring unit 38 is added thereto with a second and a third counters 38H and 38J for counting the clock signals of the oscillation circuit 38F and outputting the counted number to the A/D converter 40A and the ECU panel interface 34 as external clocks CLK1 and CLK2.

Figure 17:
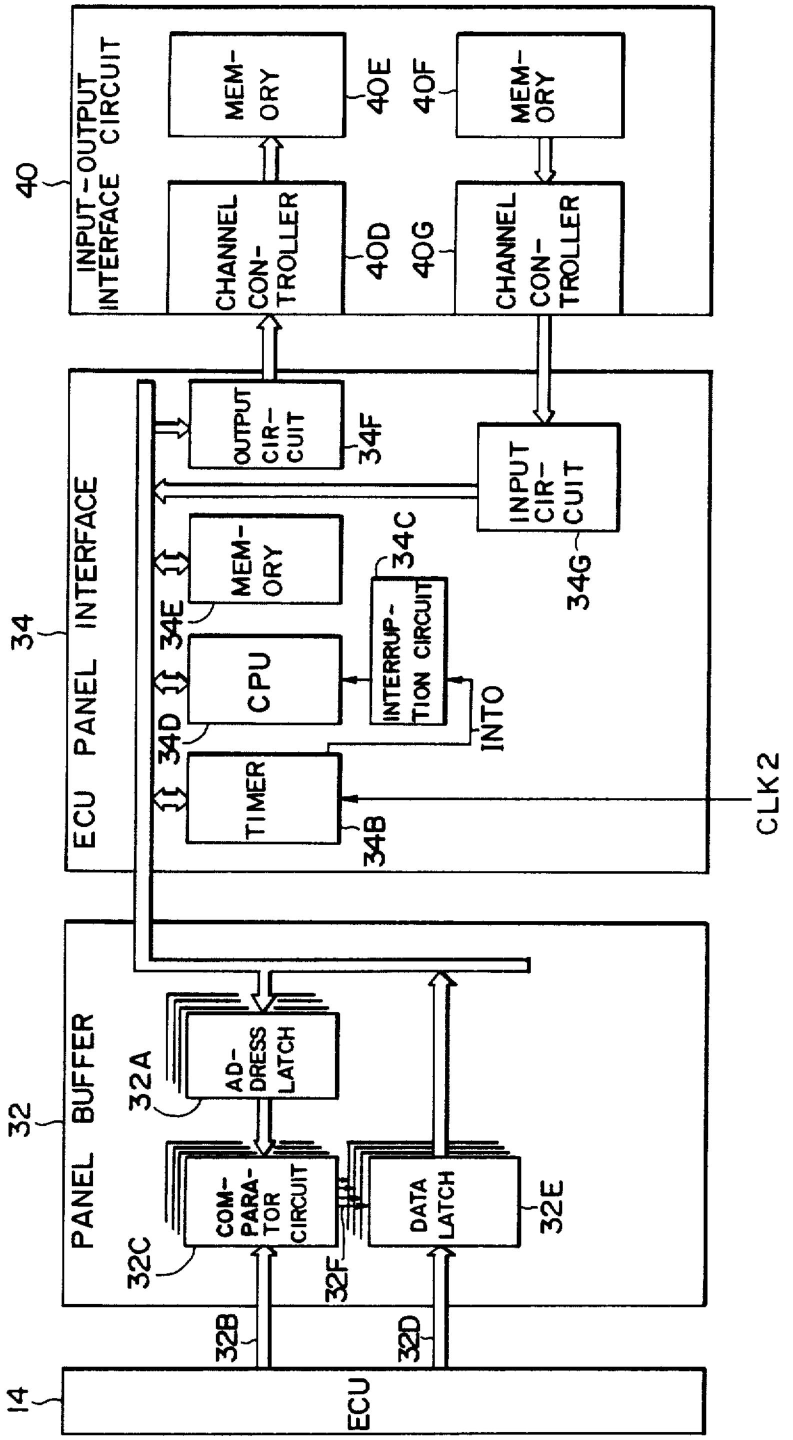
FIG. 17 is a block diagram showing the arrangement of the panel buffer and the ECU panel interface used in the third embodiment.

Furthermore, as shown in FIG. 17, the timer 34B of the ECU panel interface 34 is controlled in external synchronism by the external clock CLK2 inputted from the third counter 38J of the digital signal measuring unit 38.

Figure 15:
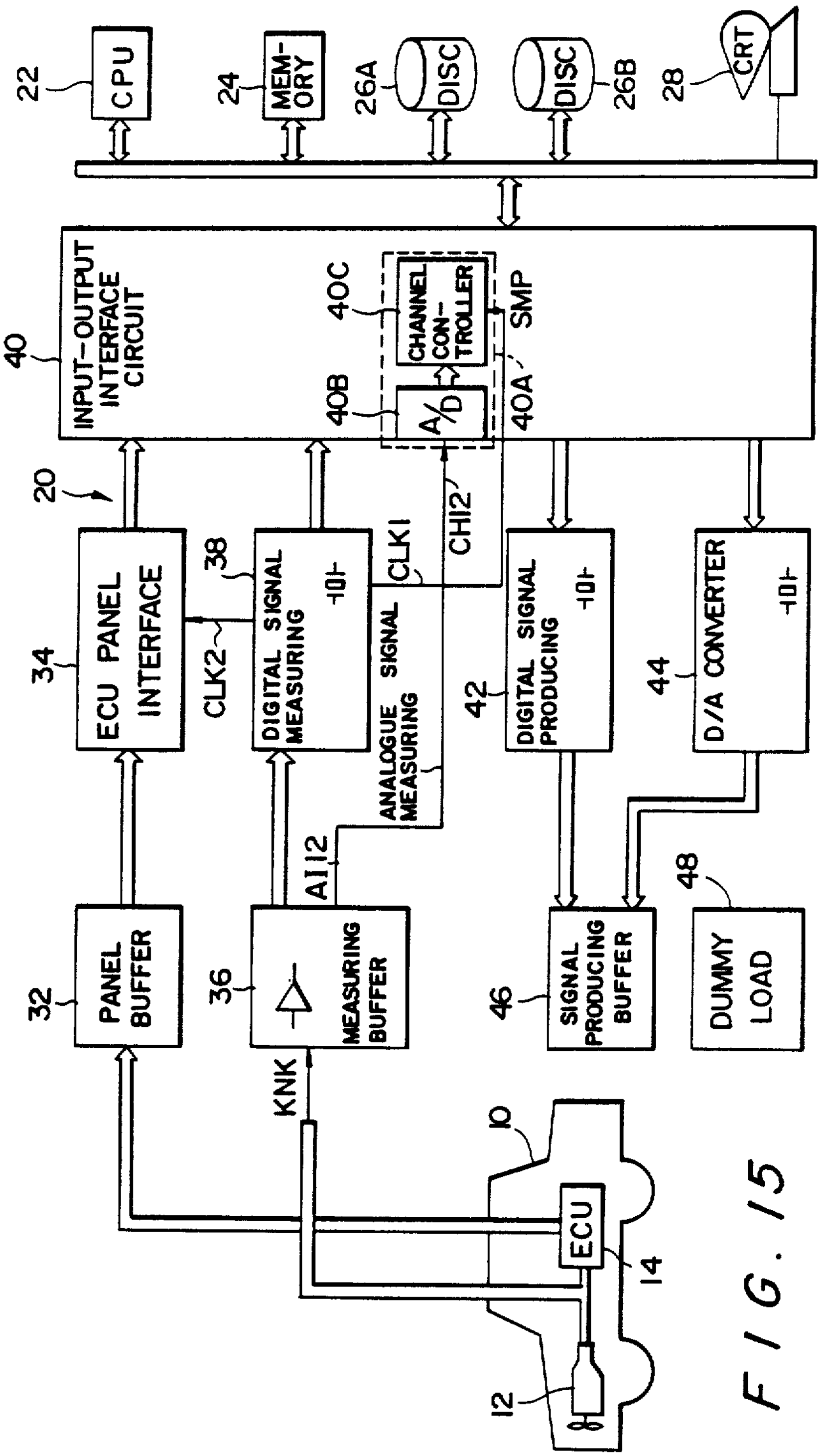
FIG. 15 is a block diagram showing the arrangement of a third embodiment of the engine control simulator, to which is applied the present invention.

Further, as shown in FIG. 15, the channel controller 40C of the A/D converter 40A is controlled in external synchronism by the external clock CLK1 inputted from the second counter 38H of the digital signal measuring unit 38.

Other respects are similar to those in the first embodiment, so that detailed description will be omitted.

In this third embodiment, not only the clock of the digital signal measuring unit 38 is controlled by the clock signal produced from the oscillation circuit 38F of the digital signal measuring unit 38, but also, both the ECU panel interface 34 and the A/D converter 40A are controlled in external synchronism, so that all the three of digital information with regard to the internal memory in the ECU 14, digital measuring information and analogue measuring information can be measured in synchronism. In consequence, even if the measuring is performed for a long period of time, the time information of the internal information and the input and output information do not fall into disorder due to a shift in the frequency of the clock, so that the measuring with high accuracy can be performed.

In this third embodiment, the clock of the ECU panel interface 34 is dispensed with and the ECU panel interface 34 is controlled in external synchronism by the external clock CLK2 generated from the digital signal measuring unit 38, so that the input and output signals can be in perfect synchronism with the internal information.

Detailed description will now be given of the fourth embodiment of the present invention.

Figure 18:
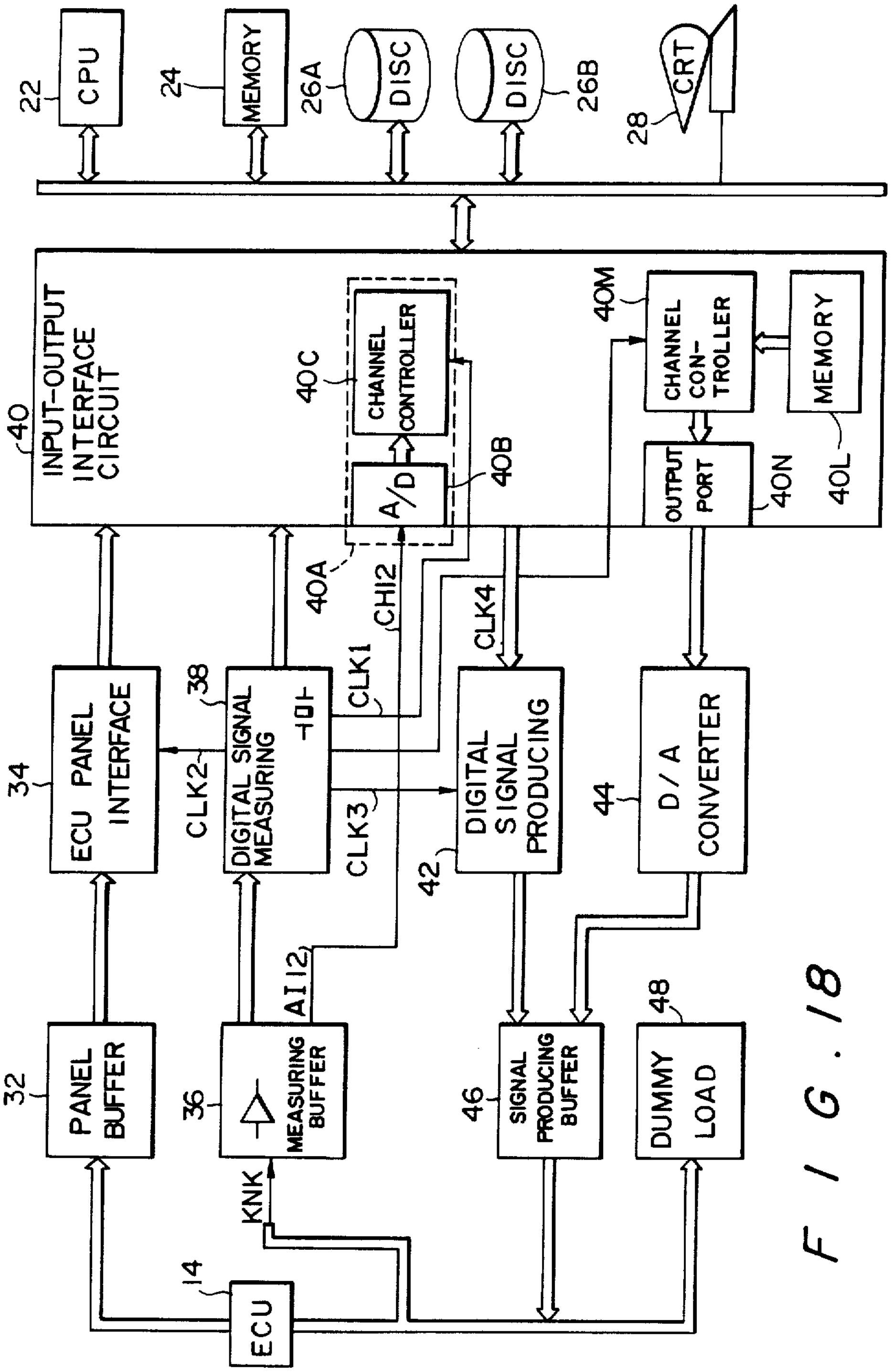
FIG. 18 is a block diagram showing the arrangement of a fourth embodiment of the engine control simulator, to which is applied the present invention.

As shown in FIG. 18, according to this fourth embodiment, in the engine control simulator 20 comprising: the CPU 22; the memory 24; the disc devices 26A and 26B; the CRT 28; the panel buffer 32; the ECU panel interface 34; the measuring buffer 36; the digital signal measuring unit 38; the input-output interface circuit 40 including the A/D converter 40A; the digital signal producing unit 42; the D/A converter 44; the signal producing buffer 46 and the dummy load 48; similarly to the aforesaid third embodiment, the A/D converter 40A and the ECU panel interface 34 are controlled in external synchronism by the external clocks CLK1 and CLK2 outputted from the digital signal measuring unit 38, and further, the digital signal producing unit 42 and a memory 40L of the input-output interface circuit 40, for outputting the digital signals to the D/A converter 44 through an output port 40N are controlled in external synchronism by the extrenal clocks CLK 3 and CLK4 outputted from the digital signal measuring unit 38, respectively. In FIG. 18, designated at 40M is a channel controller for controlling the memory 40L.

Figure 19:
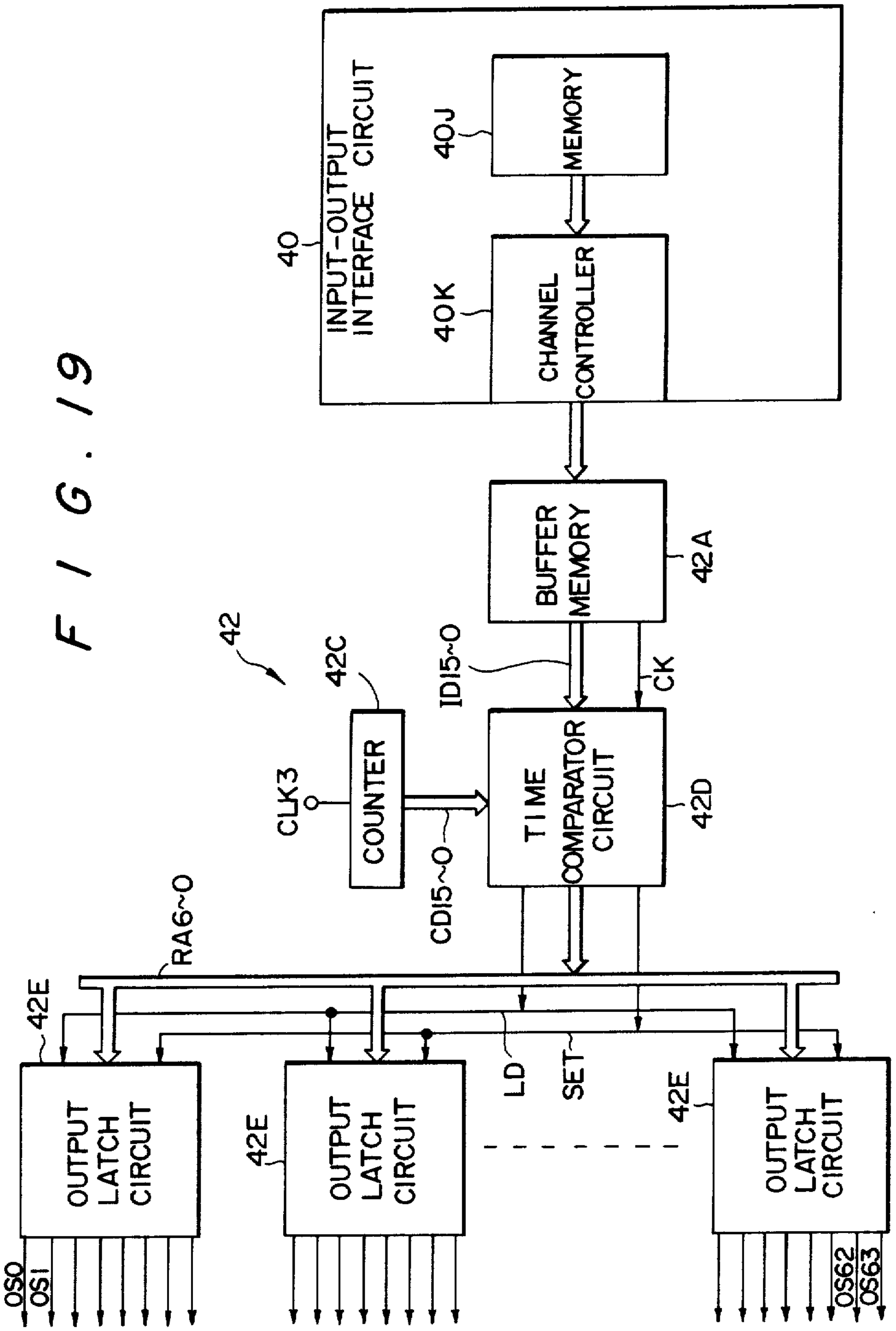
FIG. 19 is a block diagram showing the arrangement of the digital signal producing unit used in the fourth embodiment.
Figure 20:
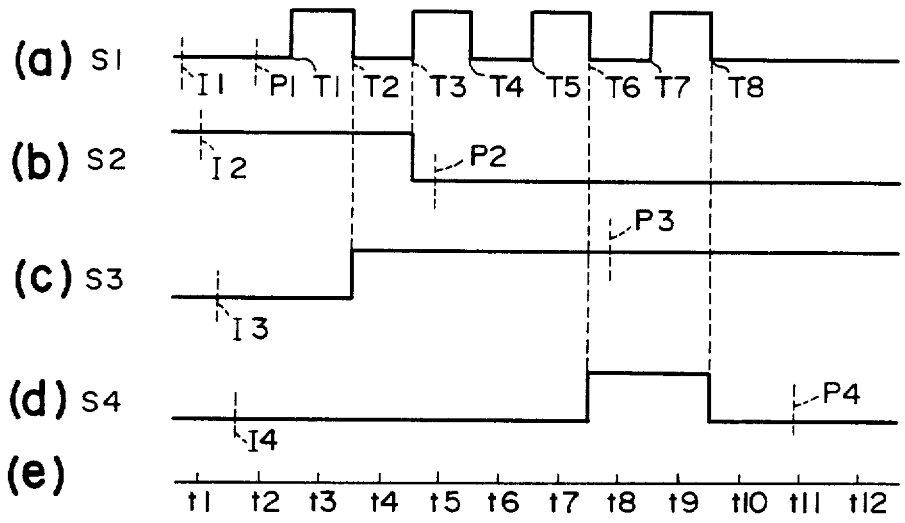
FIG. 20 is a chart showing the waveforms of the logical signals, to which is suitably applied the present invention.
Figure 23:
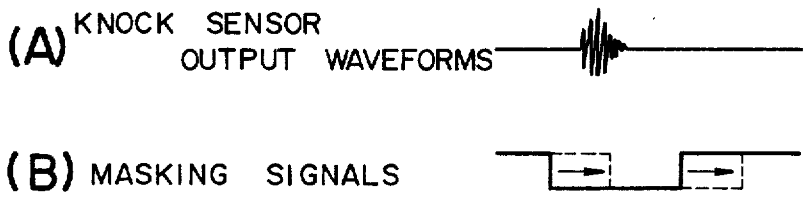
FIG. 23 is a chart showing an example of the relationship between the waveforms outputted from the knock sensor and the masking signals.
Figures 21, 22:
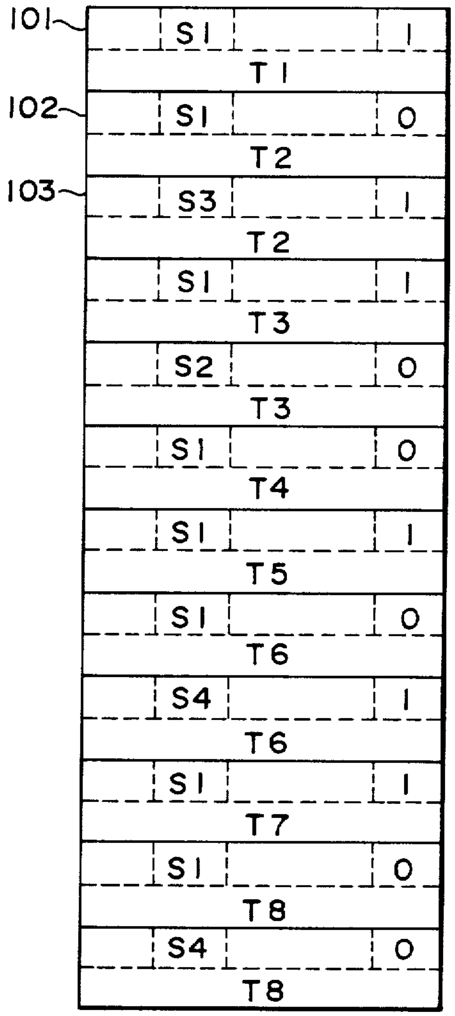
FIG. 21 is a chart showing an example of the recorded data according to the conventional sampling method.
FIG. 22 is a chart showing an example of the recorded data of the logical signals, which are recorded such that the transition time of the logical level is associated with the logical level after the transition, for working the present invention.

As shown in FIG. 19, the counter 42C of the digital signal producing unit 42 is adapted to count the external clock CLK3 inputted from the digital signal measuring unit 38, to thereby count the current time after the start of production of the logical signals.

Other respects are similar to those in the first and the third embodiments, so that detailed description will be omitted.

In this fourth embodiment, not only the clocks in the measuring system but also the clocks in the signal producing system are common, so that synchronization between the measuring system and the signal producing system can be constantly and reliably effected.

Additionally, in both the third and the fourth embodiments, the oscillation circuit 38F as being the clock generating means is incorporated in the digital signal measuring unit 38, however, the position where the clock generating means need not necessarily be limited to this, and the clock generating means may be incorporated in some other unit, or formed independently of all of other units.

In all of these embodiments, the present invention has been applied to the engine control simulator, however, the scope of application of the present invention need not necessarily be limited this, and the present invention may be applied to the ordinary computer, other signal recording apparatus or signal recording-producing apparatus as well.

What is claimed is:

1. A method of time correlating at least some of a computer's internal information to at least some of it's input and output signals, comprising the steps of:

measuring at least some of the input and output signals of the computer;

detecting the real time when the input and output signals are measured;

storing measured values of the input and output signals together with their corresponding detected times into an external storage device;

reading at least some of the computer's internal information;

detecting the real time corresponding to the reading of the internal information;

storing the internal information together with its corresponding detected time into the external storage device;

reading from the external storage device the previously stored internal information and input and output signals together with their corresponding reading times; and displaying the information read from the external storage device in a manner which time correlates the internal information with the input and output signals based on their corresponding detected times.

2. A method as set forth in claim 1, wherein said reading step occurs at predetermined intervals.

3. An arrangement for time correlating at least some of a computer's internal information to at least some of it's input and output signals, comprising:

an external storage device;

means for measuring at least some of the input and output signals of the computer;

means for detecting the real time when the input and output signals are measured;

means for storing measured values of the input and output signals together with their corresponding detected times into said external storage device;

first means for reading at least some of the computer's internal information;

means for detecting the real time corresponding to the reading of the internal information;

means for storing the internal information together with its corresponding detected time into said external storage device;

second means for reading from the external storage device the previously stored internal information and input and output signals together with their corresponding reading times; and means for displaying the information read from the external storage device in a manner which time correlates the internal information with the input and output signals based on their corresponding detected times.

4. An apparatus as set forth in claim 3, wherein:

said computer is an electronic control unit for controlling an engine mounted onto a motor vehicle;

said means for storing is a disc device of an engine control simulator operatively connected with said electronic control unit, for analyzing operating conditions of said electronic control unit;

said first reading means is an interface operatively coupled between said electronic control unit and said engine control simulator;

said means for detecting real time is incorporated in said interface;

said storing means and said second reading means are incorporated into a central processing unit of said engine control simulator; and said indicating means is a cathode ray tube of said engine control simulator.

5. A method of producing logic signals, comprising the steps of:

reading, from a storage device, logic signal defining data previously stored therein which data defines the logic signals to be produced, the previously stored logic signal defining data including transition times and corresponding logic levels immediately after each transition time;

generating logic signals based on the logic signal defining data;

monitoring, after the start of generating the logic signals, the timing of the logic signals being generated;

judging whether or not the timing of the logic signals being generated is consistent with the logic signal defining data read from the storage device; and if necessary, changing the generated logic signals such that its signal level after each transition defined by the logic signal defining data is made to correspond to the logic level after transition according to the logic signal defining data read from the storage device so that accurate logic signals can be produced from the logic signal defining data.

6. An arrangement for producing logic signals, comprising:

a storage device for storing logic signal defining data which data defines the logic signals to be generated, said logic signal defining data including transition times and corresponding logic levels immediately after each transition time;

means for reading said data from said storage device;

means for generating logic signals based on said logic signal defining data;

means for monitoring, after the start of generating of logic signals, the timing of the logic signals being generated;

means for judging whether or not the timing of the logic signals being generated is consistent with the logic signal defining data read from the storage device; and means for changing, if necessary, the generated logic signals such that its signal level after each transition is made to correspond to the logic level after transition according to the logic signal defining data read from the storage device so that accurate logic signals can be produced from the logic signal defining data.

7. An apparatus as set forth in claim 6, wherein:

said data reading means is incorporated in a central processing unit of an engine control simulator operatively connected with an engine control unit for controlling an engine mounted onto a motor vehicle for analyzing operating conditions of said engine control unit;

said monitoring means is a counter included in a digital signal producing unit of said engine control simulator for producing digital simulation signals for said electronic control unit;

said judging means is a time comparator circuit included in said digital signal producing unit; and said logic level changing means comprises output latch circuits included in said digital signal producing unit.

8. An apparatus for recording digital signals on a digital signal channel and analogue signals on an analogue signal channel simultaneously, comprising:

clock generating means for generating a clock signal;

digital signal converting means, coupled to said clock signal, for receiving said digital signal to be recorded and detecting the time of a transition of said digital signal to be recorded and the logic level of that digital signal after transition thereof and generating first digital data indicative of the time of transition and signal level following transition for recording;

analogue-digital converting means, coupled to said clock signal, for receiving said analogue signal and converting it into a second digital data for recording; and memory means for storing said first and second digital data the first and second digital data being in synchronism with one another as a result of said digital signal converting means and analogue-digital converting means being operated by a common clock signal.

9. An apparatus as set forth in claim 8, wherein said common clock signal which is output from said single clock generating means is further coupled to means for detecting the real time when at least some internal information of a computer, to be recorded, is read out.

10. An apparatus for recording signals as set forth in claim 9, wherein said time detecting means is an interface disposed between said electronic control unit and said engine control simulator.

11. An apparatus as set forth in claim 8, wherein:

said digital signal converting means is a digital signal measuring unit of an engine control simulator operatively connected with an engine control unit for controlling a motor vehicle engine, for analyzing operating conditions of said engine control unit;

said analogue-digital converting means is an analogue-digital converter included in an input-output interface circuit of said engine control simulator;

said memory means is a disc device of said engine control simulator; and said clock generating means is incorporated in said digital signal measuring unit.

12. An apparatus for recording a digital signal on a digital signal channel and an analogue signal on an analog signal channel and reproducing previously recorded digital and analogue signals, comprising:

digital signal converting means for detecting the times of transitions of a logic level of a digital signal to be recorded and the corresponding logic signal levels immediately after transition thereof and converting the same into first digital data for recording, the first digital data including, for each transition, the time of transition and the logic signal level immediately after transition;

analogue-digital converting means for converting an analogue signal to be recorded into second digital data;

a memory for storing said first and second digital data;

means for reading data from said memory, previously recorded therein, and generating logic signals in accordance with that data read from said memory;

means for monitoring the logic signals generated by said reading and generating means;

digital signal producing means for changing the logic signals generated by said reading and generating means such that the logic level after each transition is made consistent with the logic level defined for its corresponding transition time according to the data stored in said memory;

digital-analogue converting means for converting logic signals, as changed by said digital signal producing means to an analogue signal; and clock generating means for generating a common clock signal for said digital signal converting means, said analogue-digital converting means, said digital signal producing means and said digital-analogue converting means.

13. An apparatus as set forth in claim 12, wherein said common clock signal outputted from said single clock generating means is further coupled to means for detecting the real time when at least some internal information of a computer to be recorded, is read out.

14. An apparatus as set forth in claim 13, wherein said time detecting means is an interface disposed between said electronic control unit and said engine control simulator.

15. An apparatus as set forth in claim 12, wherein:

said digital signal converting means is a digital signal measuring unit of an engine control simulator operatively connected with an engine control unit for controlling an engine mounted onto a motor vehicle for analyzing operating conditions of said engine control unit;

said memory comprises disc devices of said engine control simulator;

said digital signal producing means is a digital signal producing unit of said engine control simulator;

said digital-analogue converting means is a digital-analogue converter of said engine control simulator; and said clock generating means is incorporated in said digital signal measuring unit.

* * * * *